(12) United States Patent
Langvardt Krogh et al.

(10) Patent No.: US 12,241,456 B2
(45) Date of Patent: Mar. 4, 2025

(54) POWERTRAIN ASSEMBLY FOR A WIND TURBINE

(71) Applicant: Vestas Wind Systems A/S, Aarhus N. (DK)

(72) Inventors: Lars Langvardt Krogh, Egå (DK); Henrik Zaar Mannik, Randers SV (DK); Rolf Nyborg Broge, Tilst (DK); Mustafa Gündüz, Lübeck (DE)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/578,766

(22) PCT Filed: Mar. 10, 2022

(86) PCT No.: PCT/DK2022/050043
§ 371 (c)(1),
(2) Date: Jan. 12, 2024

(87) PCT Pub. No.: WO2023/001348
PCT Pub. Date: Jan. 26, 2023

(65) Prior Publication Data
US 2024/0384706 A1    Nov. 21, 2024

(30) Foreign Application Priority Data

Jul. 20, 2021   (DK) ............................ PA 2021 70388

(51) Int. Cl.
*F03D 80/50* (2016.01)
*F03D 9/25* (2016.01)
(Continued)

(52) U.S. Cl.
CPC .............. *F03D 80/504* (2023.08); *F03D 9/25* (2016.05); *F03D 15/00* (2016.05); *H02K 7/04* (2013.01);
(Continued)

(58) Field of Classification Search
CPC ....... F03D 80/504; F03D 15/00; F03D 80/881
See application file for complete search history.

(56) References Cited

U.S. PATENT DOCUMENTS

| 10,550,827 B2 * | 2/2020 | Rogg | ...................... F03D 15/00 |
| 2022/0228563 A1 * | 7/2022 | Krogh | ..................... F03D 80/70 |

FOREIGN PATENT DOCUMENTS

| DE | 4402184 A1 | 8/1995 |
| EP | 2230750 A2 | 9/2010 |

(Continued)

OTHER PUBLICATIONS

Danish Patent and Trademark Office, technical examination issued in DK Application No. PA 2021 70388, dated Jan. 19, 2022.
(Continued)

*Primary Examiner* — Sean Gugger
(74) *Attorney, Agent, or Firm* — Wood Herron & Evans LLP

(57) ABSTRACT

A wind turbine nacelle including an outer cover defining an interior volume within which is housed a powertrain assembly comprising: a gearbox including an input shaft and an output shaft which are aligned on a common rotational axis, an electrical power generator connected to the output shaft of the gearbox. The power generator includes a generator cabinet that encloses, in an internal chamber, a stator at a radially outward position and a rotor in a radially inward position, the rotor being rotatable about the common rotational axis. The rotor comprises: a cylindrical field structure coupled to a rotor support frame; a gearbox connection flange that couples to the gearbox output shaft by a first fixing array; wherein the generator cabinet is provided with an opening that permits maintenance personal to gain access fully inside the internal chamber, and wherein the internal chamber is configured to allow maintenance personnel to access at least the first fixing array that couples the gearbox (Continued)

output shaft to the gearbox connection flange from a position fully inside the internal chamber.

27 Claims, 10 Drawing Sheets

(51) Int. Cl.
    *F03D 15/00*     (2016.01)
    *H02K 7/04*     (2006.01)
    *H02K 7/116*     (2006.01)
    *H02K 7/18*     (2006.01)
    *F03D 80/80*     (2016.01)

(52) U.S. Cl.
    CPC ........... *H02K 7/116* (2013.01); *H02K 7/1838* (2013.01); *F03D 80/881* (2023.08)

(56) References Cited

FOREIGN PATENT DOCUMENTS

| EP | 2512007 A1 | 10/2012 |
| EP | 3168461 A1 | 5/2017 |
| WO | 2010027618 A2 | 3/2010 |
| WO | 2020143888 A1 | 7/2020 |
| WO | 2020221402 A1 | 11/2020 |
| WO | 2020221403 A1 | 11/2020 |

OTHER PUBLICATIONS

International Searching Authority, International Search Report and Written Opinion issued in corresponding PCT Application No. PCT/DK2022/050043, dated Jun. 10, 2022.

* cited by examiner

POWERTRAIN ASSEMBLY FOR A WIND TURBINE

TECHNICAL FIELD

The present invention relates to a powertrain assembly, particularly for a wind turbine.

BACKGROUND TO THE INVENTION

Wind turbines convert kinetic energy from the wind into electrical energy, using a large rotor with a number of rotor blades. A typical Horizontal Axis Wind Turbine (HAWT) comprises a tower, a nacelle on top of the tower, a rotor hub mounted to the nacelle and a plurality of wind turbine rotor blades coupled to the rotor hub. Depending on the direction of the wind, the nacelle and rotor blades are turned and directed into an optimal direction by a yaw system for rotating the nacelle and a pitch system for rotating the blades.

The nacelle houses many functional components of the wind turbine, including for example a main rotor shaft, gearbox and generator, as well as convertor equipment for converting the mechanical energy at the rotor into electrical energy for provision to the grid. The gearbox steps up the rotational speed of the low-speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system. So-called "direct drive" wind turbines that do not use gearboxes are also known. In a direct drive wind turbine, the generator is directly driven by the main rotor shaft.

Ordinarily, the generator of a wind turbine is an IPM (interior permanent magnet) electric machine composed of an external stator assembly which surrounds an internal rotor assembly. The IPM internal rotor assembly is typically composed of a ring like structure comprising multiple annular permanent magnetic packages, supported on a central shaft. The gearbox output shaft interfaces with the central shaft of the rotor assembly.

WO2020143888 A1 shows a particular type of IPM electric machine for use as a generator in a wind turbine. In this example, the ring-shaped structure is supported on one of its ends by an annular support frame. Not having a central hub in the rotor assembly results in a number of important benefits, such as reduced cost and weight and improved cooling airflow. Cooling air that is provided centrally to the generator can freely flow in axial and radial directions and effectively cool the rotor and any generator parts located in its direct vicinity. Further refinements to this design are desirable, however, for example to enhance maintainability of the assembly.

It is an object of the present invention to provide a solution to one or more of the problems mentioned above.

SUMMARY OF THE INVENTION

According to a first aspect of the invention, there is provided a wind turbine nacelle including an outer cover defining an interior volume within which is housed a powertrain assembly comprising: a gearbox including an input shaft and an output shaft which are aligned on a common rotational axis, an electrical power generator connected to the output shaft of the gearbox, wherein the power generator includes a generator cabinet that encloses, in an internal chamber, a stator at a radially outward position and a rotor in a radially inward position, the rotor being rotatable about the common rotational axis. The rotor comprises: a cylindrical field structure coupled to a rotor support frame; a gearbox connection flange that couples to the gearbox output shaft by a first fixing array; wherein the generator cabinet is provided with an opening that permits maintenance personal to gain access fully inside the internal chamber, and wherein the internal chamber is configured to allow maintenance personnel to access at least the first fixing array that couples the gearbox output shaft to the gearbox connection flange from a position fully inside the internal chamber.

An advantage of the invention is that the powertrain assembly includes a gearbox coupled to a generator which is configured particularly to ease the process of servicing. Typically, powertrain systems including gearboxes that are coupled to generators require that all servicing be carried out from access points outside of the generator. However, in the powertrain assembly of the invention, the generator cabinet defines an internal chamber into which a service technical can climb into fully to access various components of the generator system from a location fully inside the generator cabinet. This means that there is no need to access components from the outside of the generator, as full access is possible by the service personnel when their entire body is located inside the internal chamber. This is not possible in known systems.

In one embodiment, the gearbox is a planetary gearbox with at least two stages. This provides an especially space efficient system in which the gearbox and the generator are located in inline positions.

In addition to the first fixing array, the internal chamber may be configured so that maintenance personnel can access other components from fully inside, such as: a second fixing array that couples the gearbox connection flange to the rotor support frame, a tie rod system, rotor balancing masses, a drive ring gear.

Usefully, the rotor internal diameter defined by the cylindrical field structure may be greater than 2 m or even greater than 2.2 m in order to provide space for service personnel.

The generator cabinet and the rotor may be configured beneficially to maximise space inside for maintenance personnel. For example, the rotor connection flange of the rotor support frame may be spaced from the gearbox connection flange along the rotational axis by a distance that is at least 25% of the maximum outer diameter of the rotor support frame; the gearbox connection flange may defines a first diameter and wherein the tie-rod system may define a second diameter and wherein the first diameter is less than the second diameter, wherein the first diameter may be less than 0.7 m and wherein the second diameter may be greater than 2 m and wherein the rotor connection flange of the rotor support frame is spaced from the gearbox connection flange along the rotational axis by a distance that is between 20% and 60%, and preferably between 20% and 40% of the internal diameter of the rotor connection flange.

In one embodiment, the rotor support frame may define access apertures. These apertures are particularly useful for accessing components outside the rotor support frame. For example, the access apertures may provide access therethrough to at least one of the following generator features: i) a stray current protection system ii) one or more rotary sensor components associated with the gearbox output shaft, iii) accelerometer systems, iv) temperature sensors, v) pitch tube sealing components. In preferred embodiments, access through the apertures may be achieved to at least two of the aforementioned features, and at least three of the aforementioned features.

The invention embraces a wind turbine comprising a tower and a nacelle as defined above.

The invention also extends to a method of servicing a wind turbine powertrain in a nacelle of a wind turbine, wherein the powertrain comprises a gearbox including an input shaft and an output shaft which are aligned on a common rotational axis, and an electrical power generator connected to the output shaft of the gearbox, wherein the power generator includes a generator cabinet that defines an internal chamber which permits access to maintenance personnel inside the generator cabinet, the generator cabinet enclosing a stator at a radially outward position and a rotor in a radially inward position, the rotor being rotatable about the common rotational axis, wherein the rotor comprises a cylindrical field structure coupled to a rotor support frame, and a gearbox connection flange that couples to the gearbox output shaft by a first fixing array; and wherein the internal chamber permits access to maintenance personnel inside the generator cabinet. The method comprises: gaining access to the internal chamber of the electrical power generator through an opening defined by the generator cabinet; and, carrying out service operations from a position fully inside the internal chamber.

In a particularly beneficial aspect, the service operations may include servicing at least one of the following items by maintenance personnel from a position fully inside the internal chamber: i) a second fixing array that couples the gearbox connection flange to the rotor support frame; ii) a tie rod system that couples the rotor support frame to the cylindrical field structure; iii) a plurality of balancing adjustment masses configured to provide rotational balance to the cylindrical field structure; iv) a drive ring gear.

The generator cabinet may be provided with one or more closure elements which are configured to selectively close the opening defined by the generator service cabinet into the internal chamber. The generator cabinet therefore results in a normally closed environment for servicing purposes which service engineers may access when required. Suitable access control system may be associated with the closure to ensure that access is only enabled under safe conditions. The closed environment therefore means that the service area can be more readily kept clear of contamination.

BRIEF DESCRIPTION OF THE DRAWINGS

The present invention will now be described, by way of example only, with reference to the attached drawings, in which.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put into effect without the specific details and that in some instances, well known methods, techniques and structures have not been described in detail in order not to obscure the invention unnecessarily.

The invention relates in general to an electrical generator configuration which has several advantages associated with maintainability of the generator and the associated gearbox to which it is connected. In particular, the generator configuration provides a maintenance engineer with improved access inside the generator which enables various types of adjustments to be made without disassembly of some or all of the generator, which is a significant advantage in the confines of a wind turbine nacelle.

Figure 1:
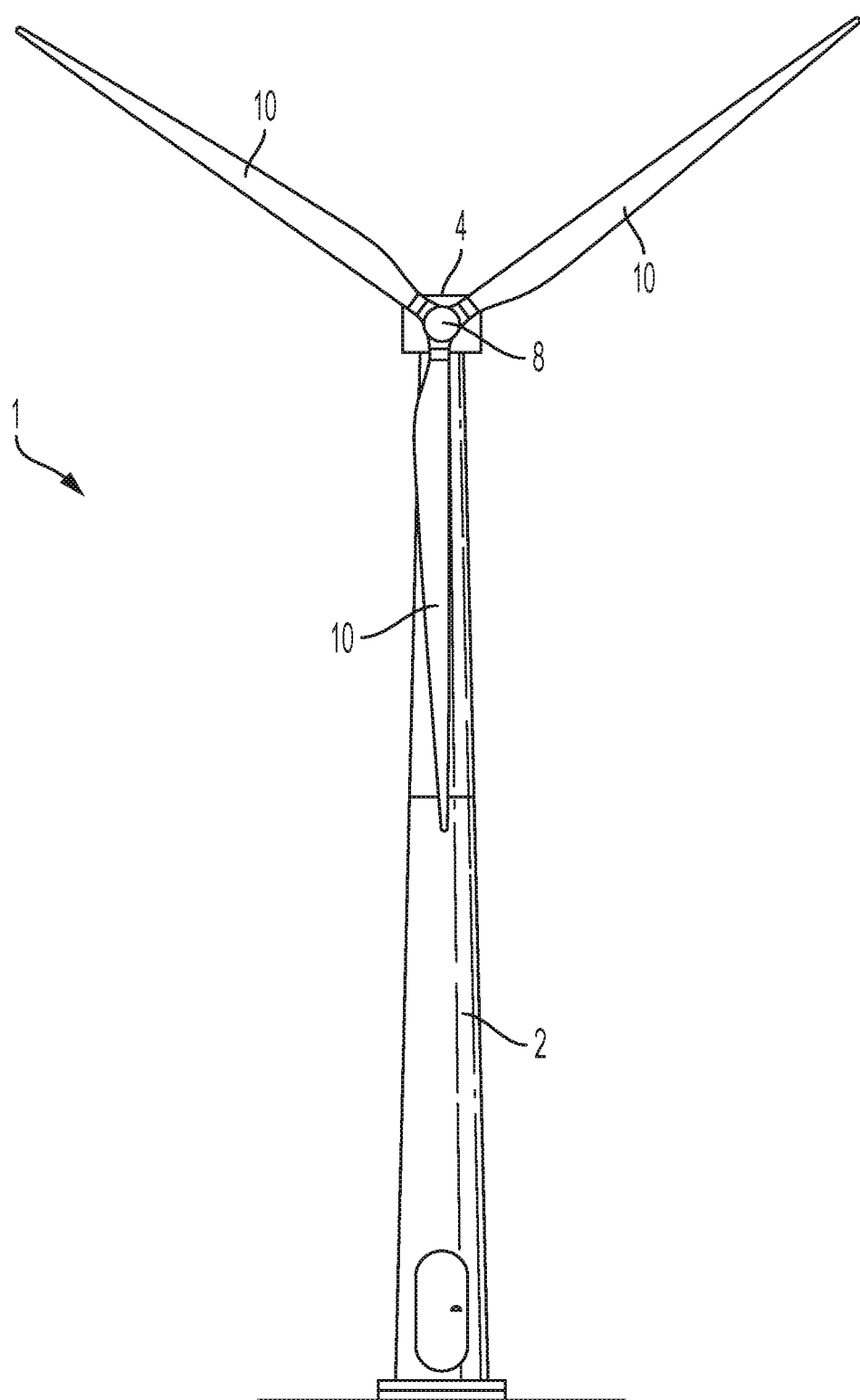
FIG. 1 is a front view schematic diagram showing a known wind turbine configuration.

In order to place the embodiments of the invention in a suitable context, reference will firstly be made to FIG. 1, which illustrates a typical Horizontal Axis Wind Turbine (HAWT) in which a generator rotor assembly according to an embodiment of the invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system, a rotor hub 8 mounted to the nacelle 4 and a plurality of wind turbine rotor blades 10 coupled to the rotor hub 8. The nacelle 4 and rotor blades 10 are turned and directed into the wind direction by the yaw system.

Figure 2:
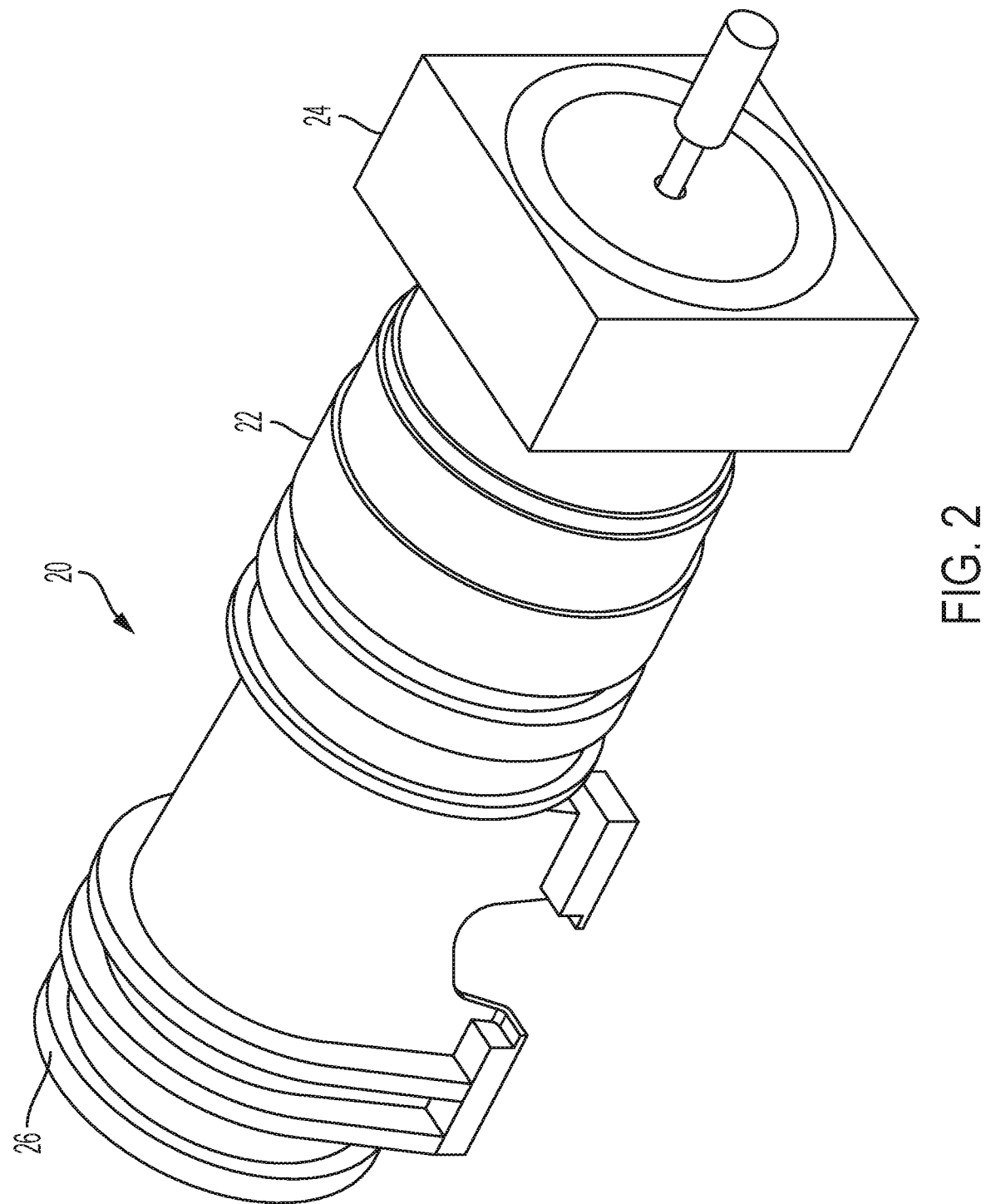
FIG. 2 is a view of example powertrain components that may be housed in a nacelle of the wind turbine in FIG. 1.

The nacelle 4 houses many functional components of the wind turbine, including the generator, gearbox, and rotor brake assembly, as well as convertor equipment for converting the mechanical energy of the wind into electrical energy for provision to the grid. FIG. 2 illustrates an example of a layout within the nacelle 4, that layout including a main shaft 26, which extends through a main bearing housing 20, a gearbox 22 and a generator 24. The main shaft 26 is connected to, and driven by, the rotor 8 and provides input drive to the gearbox 22. Collectively, these components may be considered to be a powertrain of the wind turbine. The gearbox 22 steps up the rotational speed of the low-speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system.

Figure 3:
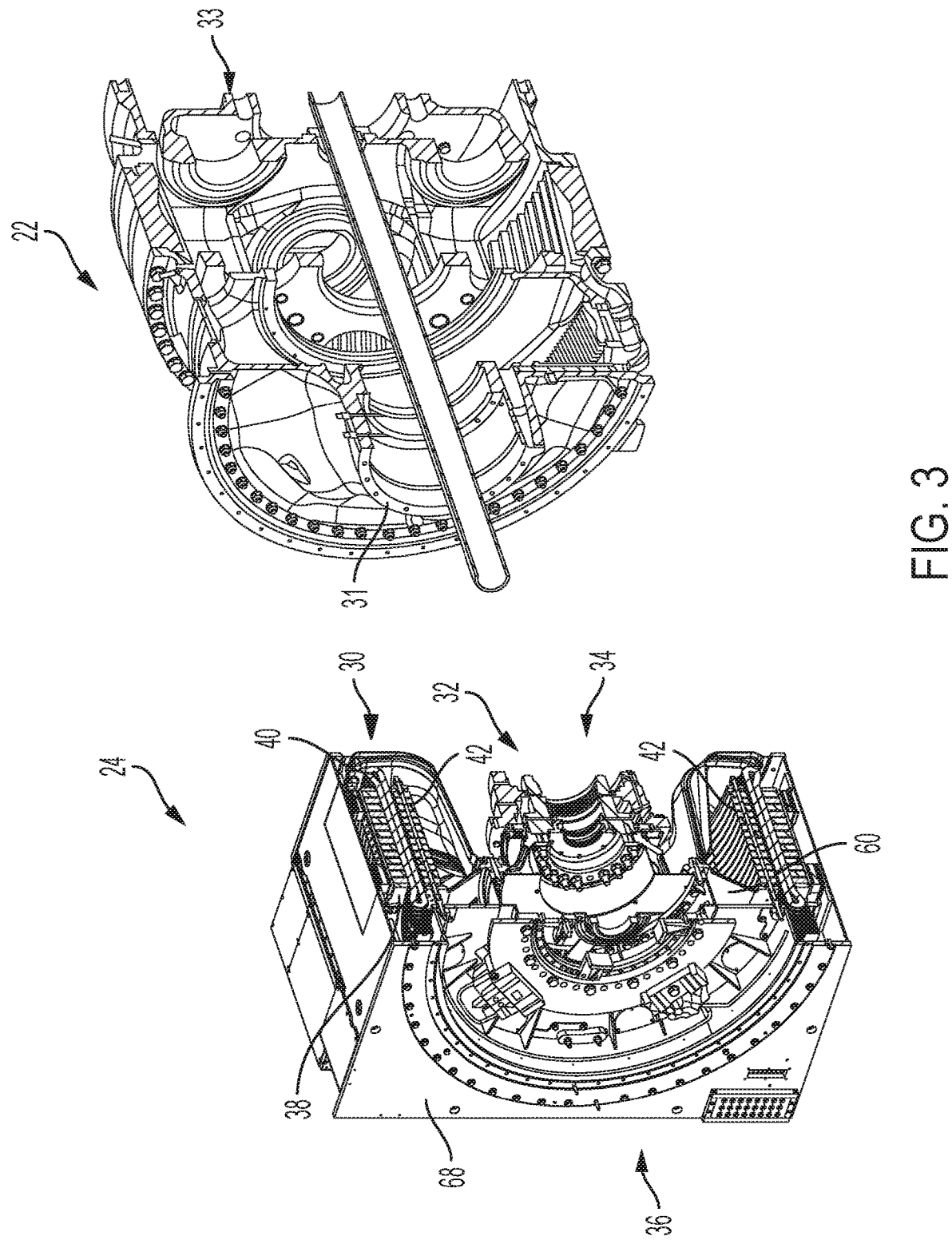
FIG. 3 is a cutaway view of a known configuration including a generator coupled to a gearbox, shown in axially-spaced positions.

The gearbox 22 and generator 24 may be coupled together in an integrated unit. FIG. 3 shows the generator 24 in more detail. With reference firstly to the gearbox 22, a gearbox housing is generally cylindrical in form which is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The general configuration of the gearbox is such that the input shaft and output shaft are arranged on a common axis. The ratio of the number of teeth between the ring gear, the planet gear and the sun gears determine the gear ratio of the gearbox. For clarity, fine detail of the gearbox will not be described in further detail here as the gearbox is not the principal subject of the invention. Suffice to say that other gearbox configuration could also be used, although it is currently envisaged that an epicyclic gearbox provides an elegant solution fit for the confines of a wind turbine nacelle. Such an epicyclic gearbox may contain more than one epicyclic stage, for example one, two or three epicyclic gear stages.

Figure 4:
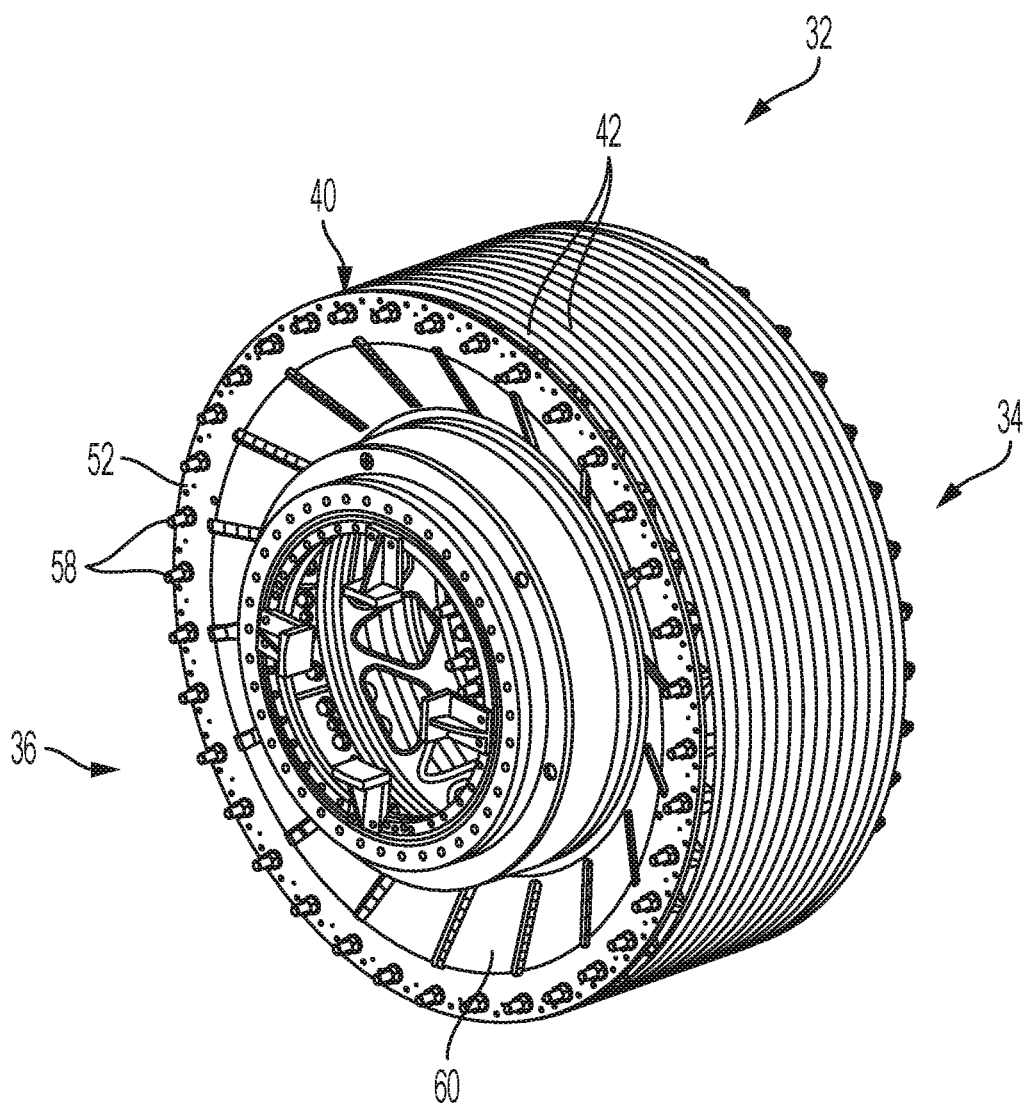
FIG. 4 is a perspective view of a generator rotor assembly of the known generator in FIG. 3, as seen from a non-drive end thereof.
Figure 5:
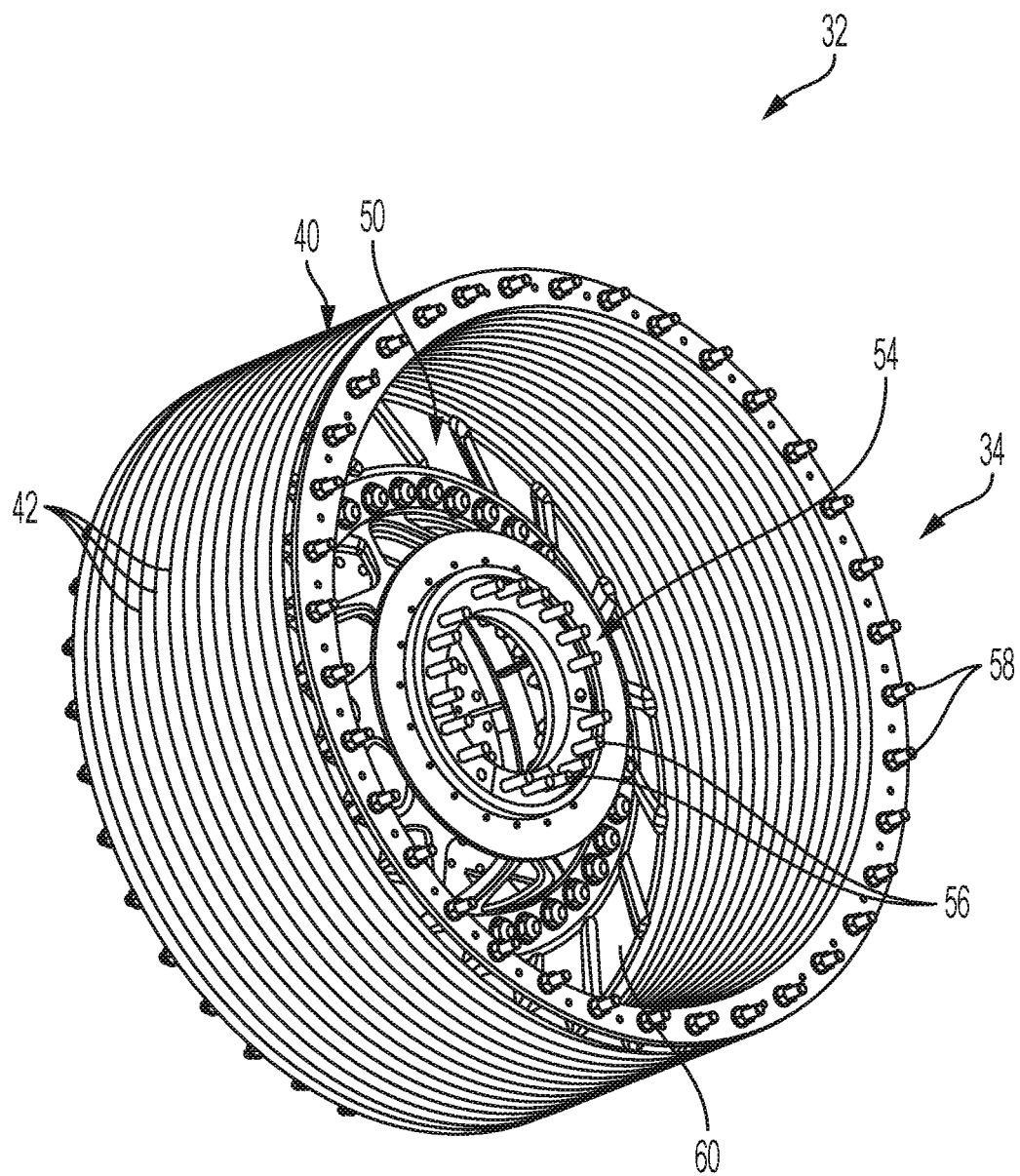
FIG. 5 is a perspective view of the rotor assembly shown in FIG. 4, but seen from a drive-end.

Referring still to the cutaway view of FIG. 3, but also to FIGS. 4 and 5, the generator 24 is an IPM (interior permanent magnet) electric machine having an external stator assembly 30, which surrounds an internal rotor assembly 32. The stator assembly 30 includes stator windings 38, a stator core 40 and a stator frame (not shown) which surrounds and supports the stator windings 38 and stator core 40. It is however noted that the invention is not limited to a specific type of stator. Notably, the internal configuration of the generator 24 shown in FIG. 3 is provided here by way of example and to give the invention its proper context. The specific configuration of the generator rotor 32 in FIGS. 3 to 5 does not form part of the invention and is provided for a better understanding of the configuration of a generator rotor in accordance with an embodiment of the invention, as will be described later with reference to FIGS. 6 to 11.

The gearbox 22 is coupled to the generator 24 by way of an output shaft 31 which connects to the rotor assembly 32 of the generator 24. As such, the major axis of the gearbox output shaft 31 defines the rotational axis of the generator 24. Notably, the gearbox also includes an input shaft 33 which is coaxially aligned with the gearbox output shaft 31. Although the generator rotor assembly 32 is shown in cross section in FIG. 3 in-situ within the generator 22 it is shown in isolation in FIGS. 4 and 5.

The generator rotor assembly 32 has a drive end 34 and a non-drive end 36. The drive end 34 faces towards the gearbox 22 and the non-drive end 36 faces away from the gearbox 22. The non-drive end 36 of the generator rotor assembly 32 can be seen in FIG. 4, and the drive-end 34 of the generator rotor assembly 32 can be seen in FIG. 5.

The generator rotor assembly 32 comprises a cylindrical ring structure 40 that defines a hollow central region and which is arranged to rotate around a rotational axis. The cylindrical ring structure 40 comprises a plurality of solid circular rotor bars 42 which accommodate permanent magnet packages. The ring structure 40 therefore is responsible for generating the rotating magnetic field of the generator, in use. Here, the bars 42 are shown as being of equal circumference and thickness, but that can vary. The bars 42 are arranged coaxially around the rotational axis, such that when assembled the arrangement of bars 42 defines a cylindrical structure with a central hollow area. The bars 42 are spaced apart by an equal distance such that a gap is defined in between each pair of bars 42. These gaps allow air that is provided centrally to the generator to flow through the rotor structure and cool the generator rotor assembly as well as other parts of the generator, including parts that are located radially outside the rotor assembly 32. This airflow is further enhanced by the fact that no central hub is needed for providing structure and support for the rotor assembly 32.

The cylindrical ring structure 40 is connected to a rotor support frame 50. The rotor support frame 50 comprises a radially outer first connection flange 52, which is best seen in FIG. 4, and a radially inner second connection flange 54, which is best seen in FIG. 5. The first connection flange 52 serves to connect the bars 42 to the rotor support frame 50, and so can be considered to be a 'rotor connection flange', whilst the second connection flange 54 serves to couple the rotor support frame 50 to the gearbox output shaft 31, and so can be considered to be a 'gearbox connection flange'. In FIG. 5, a set of connecting bolts 56 can be seen extending perpendicularly out of the second connecting flange 54 which would be used to fix the support frame 50 to the gearbox output shaft 31.

The support frame 50 and the cylindrical ring structure 40 are connected together by a plurality of tie rods 58 (only two of which are identified in FIGS. 4 and 5) which extend axially through respective holes in the bars 42 and are secured through the rotor connection flange 52 of the support frame 50. Suitable mechanical fasteners such as bolts are provided on extremities of each of the tie rods 58 and are tightened to place the package of bars 42 into compression thus securing the cylindrical ring structure 40 securely to the support frame 50 as an integral unit.

It will be noted that the rotor connection flange 52 and the gearbox connection flange 54 are axially-facing surfaces and extend in respective planes that are parallel to but spaced apart from one another along the rotor axis. In this respect, the gearbox connection flange 54 extends somewhat into the hollow internal area defined by the cylindrical ring structure. Moreover, the circumference of the gearbox connection flange 54 is smaller than the rotor connection flange 52.

The support frame 50 further comprises a transition section 60 that extends between the rotor connection flange 52 and the gearbox connection flange 54. The transition section 60 is generally frustoconical and extends at a steep angle with respect to the rotor axis. As shown here, the transition section 60 defines an angle of approximately 70 to 80 degrees with respect to the rotor axis. In other words, the transition section 60 has a cone angle of approximately 140 to 160 degrees.

When the generator is assembled, the generator rotor assembly 32 is surrounded by the external stator 30. In turn, both the rotor assembly 32 and the stator 30 are surrounded by a generator housing or cabinet 68, which can be best appreciated by FIG. 3.

With reference to the known configuration of generator rotor assembly 32 as described above, it should be appreciated that the configuration provides various advantages in terms of generator design and efficiency, but it also presents challenges. For example, interior access of the generator is limited which makes it problematic for maintenance engineers to access the internals of the generator in order to check internal components and take remedial action where required.

The embodiments of the invention involved an improved configuration of generator rotor assembly that address these issues. An embodiment of the invention will now be described with reference to the remaining figures.

The illustrated embodiment provides a generator rotor assembly 70 which is equivalent in function to the known configuration of generator rotor assembly 32 discussed above. However, the embodiments of the invention confer several advantageous aspects, as will be explained in further detail in this discussion.

Figure 6:
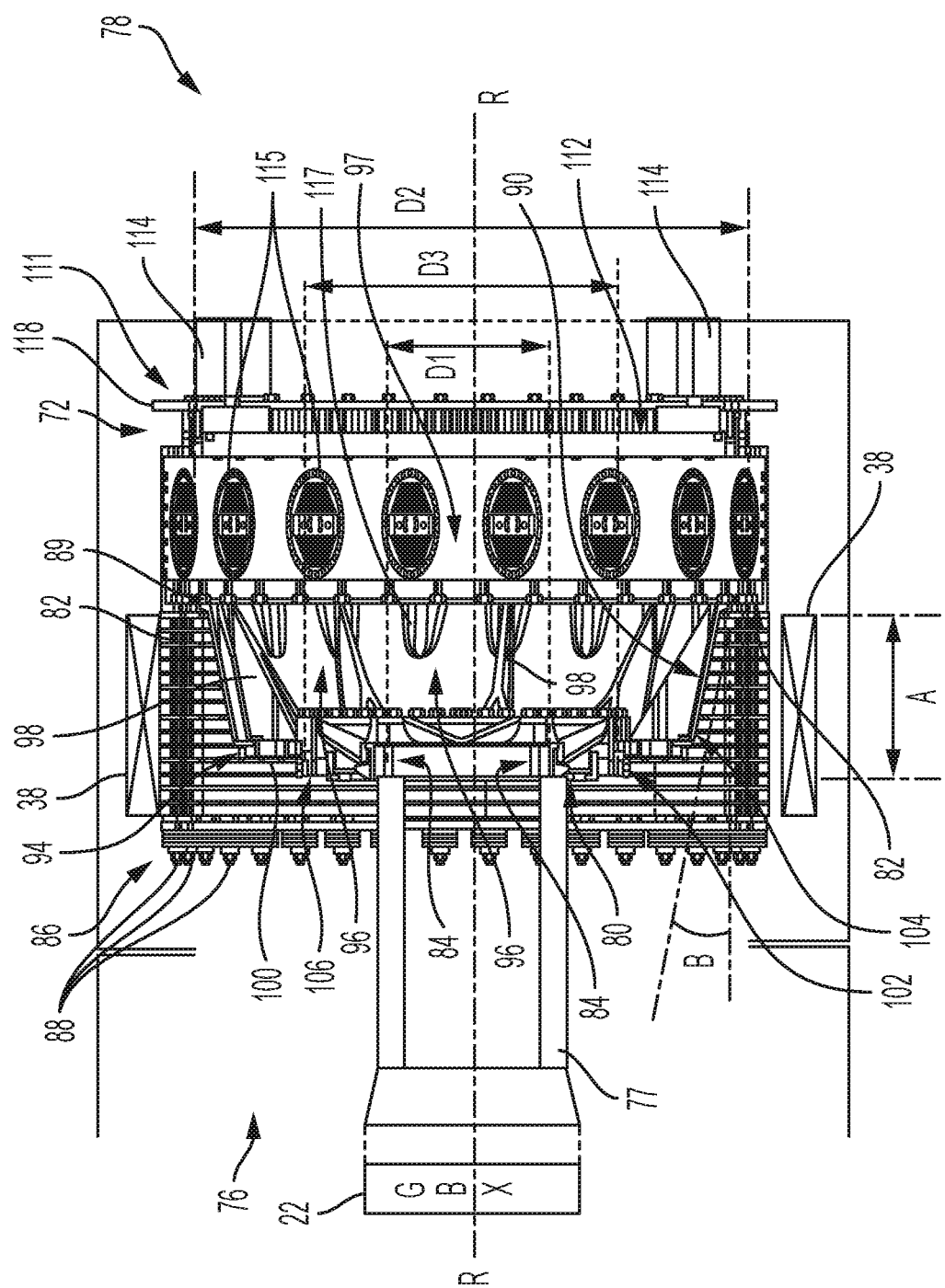
FIG. 6 is a longitudinal cross-section of a generator rotor assembly in accordance with an embodiment of the invention, viewed in part-schematic form located inside a generator service cabinet. The generator rotor assembly comprises a cylindrical field structure that is mated to a rotor support hub or frame and may be used in the generator as shown in the previous Figures.
Figure 7:
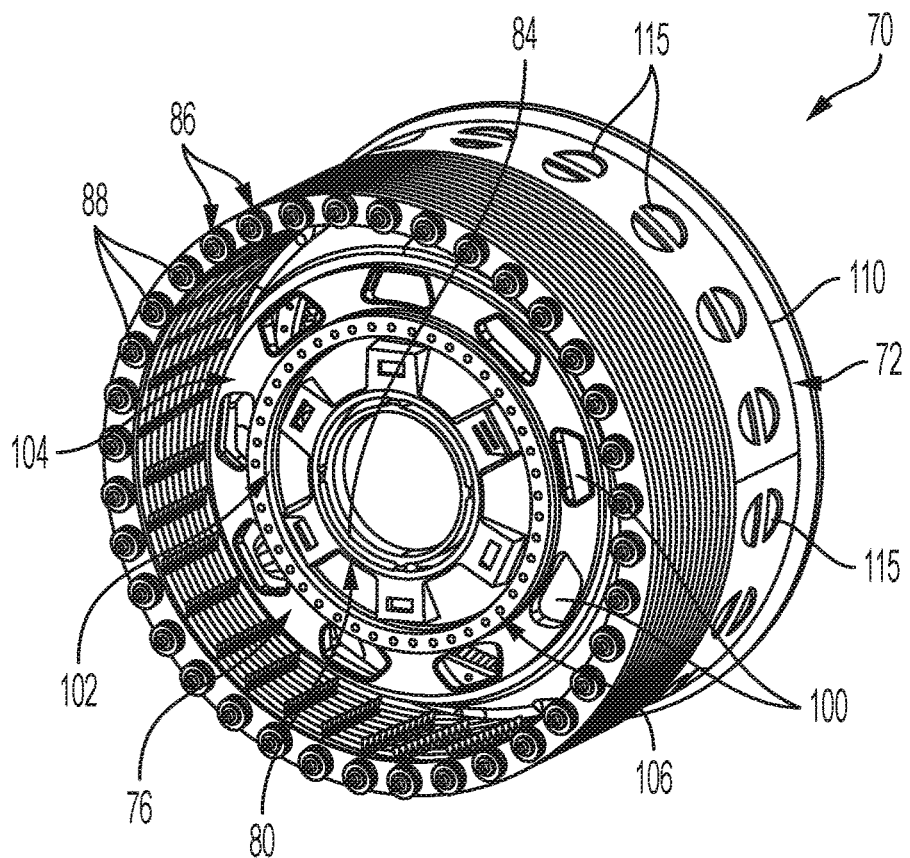
FIG. 7 is a perspective view of a generator rotor assembly of FIG. 6 in isolation of the generator service cabinet.
Figure 8:
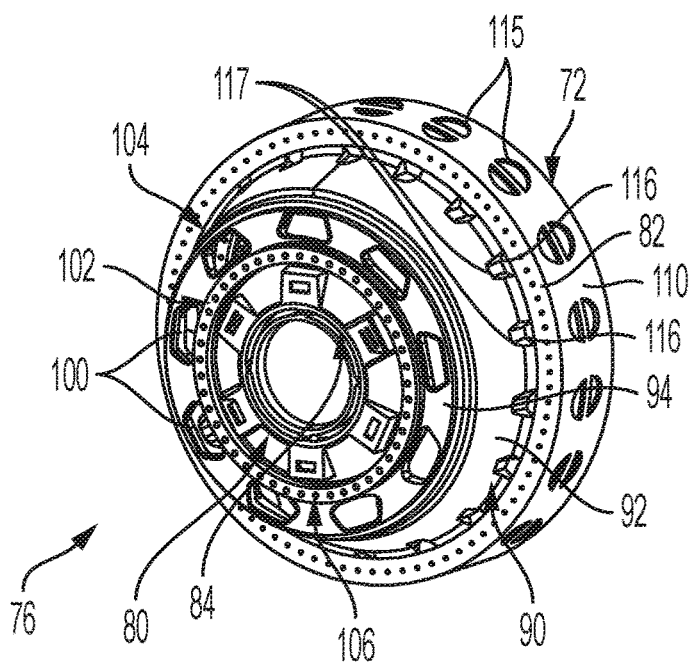
FIG. 8 is another front perspective view of the generator rotor assembly of FIG. 6, but with the cylindrical field structure omitted.
Figure 9:
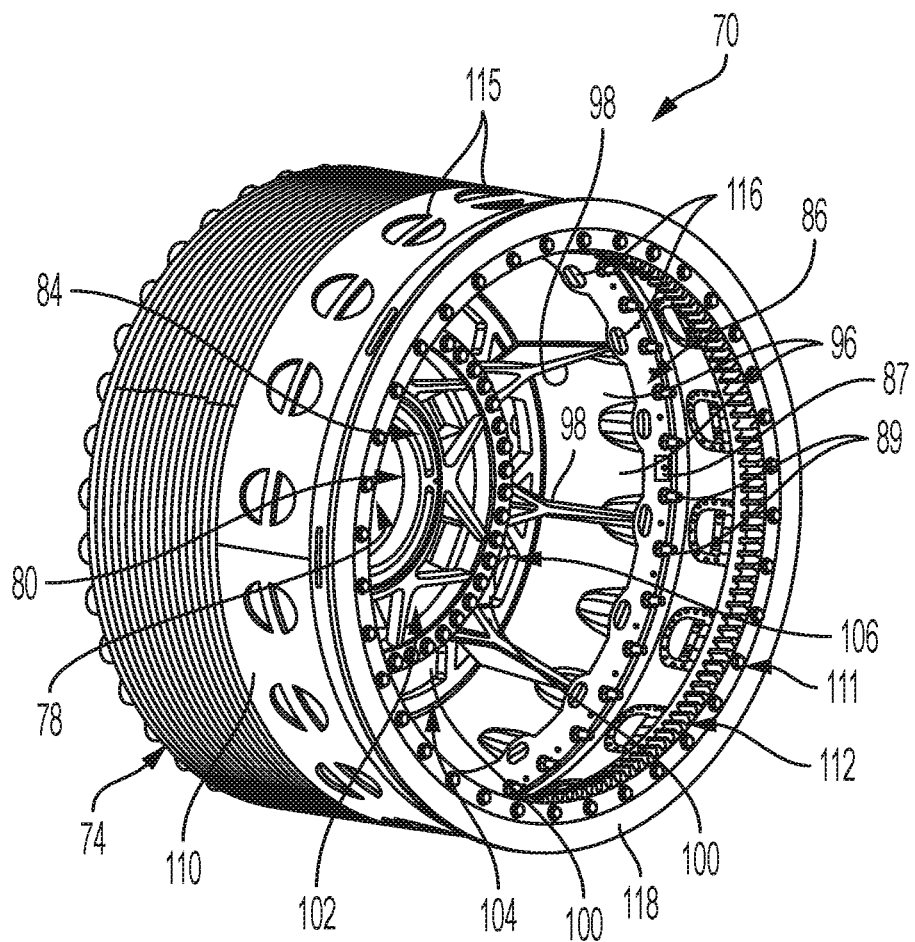
FIG. 9 is perspective view of the generator rotor assembly of FIG. 7, when viewed from its non-drive end.

Whereas FIG. 6 illustrates the generator rotor assembly 70 in part-schematic view in relation to the surrounding components of the generator housing or 'cabinet' 81, FIGS. 7 to 9 show the generator rotor assembly 70 in isolation from the generator cabinet 81. At this point, it should be noted that the generator rotor assembly 70 of the illustrated embodiment shares many similarities to that discussed earlier so only the differences will be focused on here.

At a broad level, the generator rotor assembly 70 includes a rotor support frame 72 which supports a cylindrical field structure 74 that acts as a magnet carrier thereby to generate a rotating magnetic field in use. The configuration of the cylindrical field structure 74 is comparable to what has been described with reference to FIGS. 3 to 5, so further detailed discussion on this assembly will be omitted.

The generator rotor assembly 70 includes a drive end 76, and a non-drive end 78. The drive end 76 is connectable to an output drive shaft 77 of the gearbox 22 and the non-drive end 78 is distal from the gearbox 22. In effect, the generator rotor assembly 70 can be considered to be rotationally suspended from the gearbox output shaft 77 in a cantilever manner as the non-drive end is not rotationally supported by a bearing.

In essence, the rotor support frame 72 provides a means of coupling the gearbox output shaft 77 to the cylindrical field structure 74. To this end, the rotor support frame 72 comprises a gearbox connection flange 80 and a rotor connection flange 82.

The gearbox connection flange 80 and the rotor connection flange 82 are both axial-facing surfaces that are oriented perpendicular to the rotational axis R of the generator rotor assembly 70 and are spaced along that axis relative to one another. Both flanges 80,82 therefore extend in a plane perpendicular to the rotational axis R in the illustrated embodiment.

Figure 10:
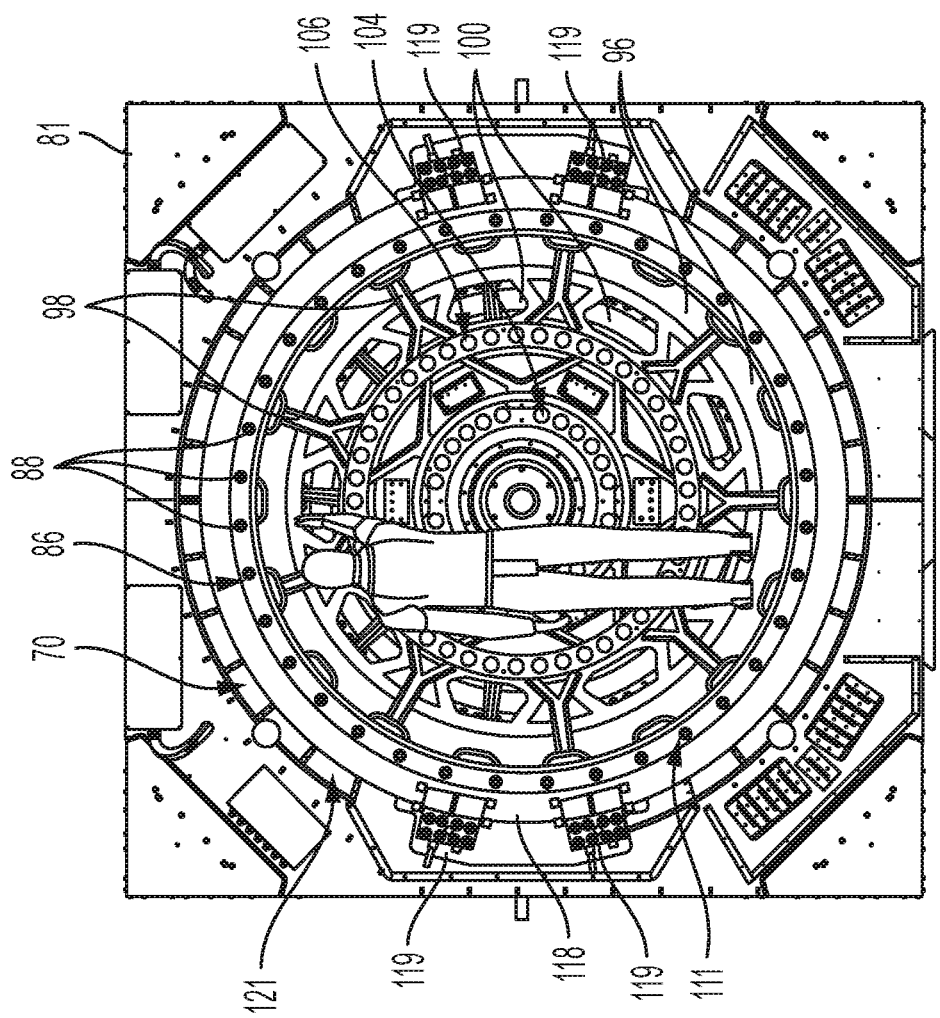
FIG. 10 is an end view of the generator rotor assembly of FIGS. 6 to 9 inside its respective generator cabinet, showing a maintenance engineer standing inside the support frame in order to access internal components.

The gearbox connection flange 80 comprises an annular fixing slot arrangement 84 through which means the rotor support frame 70 is connectable to the gearbox output shaft 77 by a set of suitable bolts (not shown). The fixing slot arrangement 84 therefore defines a first pitch circle diameter which is shown in FIG. 10 as "D1".

The rotor connection flange 82 is coaxial with the gearbox connection flange 80 and has a larger diameter. The rotor connection flange 82 secures to the cylindrical field structure 74 by means of a tie-rod system 86 comprising a plurality of circumferentially spaced tie rods 88 that extend through the individual bars of the cylindrical field structure 74, as in the previous embodiment. The circular arrangement of tie rods 88 therefore define a second pitch circle diameter, shown as D2 in FIG. 6. As can be seen the first pitch circle diameter is smaller than the second pitch circle diameter D2. In the illustrated embodiment, the first pitch circle diameter D1 is approximately 30% of the second pitch circle diameter D2.

Conveniently, the tie rod system 86 includes a balancing means to adjust the rotational balance of the cylindrical field structure 74. The balancing means can be achieved by adding shims or washers that can be captured between the rotor connection flange 82 and a tie rod fastener 89, such as a hexagonal nut. Tensioning of the tie rods 88 can be achieved by appropriate turning of the respective fastener 89 which applies a compressive force to the cylindrical structure 74, whereas adjustment of the rotational balance can be achieved by adding or removing balancing shims around the array of tie rods 88 until an optimum rotating balance is obtained.

A transition section 90 extends between the gearbox connection flange 80 and the rotor connection flange 82. The functionality of the transition section 90 is to provide rigidity to the rotor support frame 72, whilst maintaining the rotor connection flange 82 and the gearbox connection flange 80 in a spaced relationship and promoting good airflow through the structure.

As can be readily observed from the Figures, the transition section 90 comprises two main portions, namely a first frustoconical portion 92 and a second axial-facing surface portion 94. The frustoconical portion 92 is proximal to the rotor connection flange 82 and the axial-facing surface portion 94 is proximal to the gearbox connection flange 80.

The frustoconical portion 92 comprises a plurality of regions 96 (not all of which are labelled on the Figures, for clarity) that are relatively flat since they are oriented at a shallow angle to the rotational axis. Since each of the regions 96 extends in an axial direction at a relatively shallow angle to the rotational axis, they provide an area which is suitable for supporting a maintenance engineer inside the rotor support frame 72. Each of the regions 96 can therefore be considered a stepping region. In the illustrated embodiment, there are a total of nine stepping regions 96.

Each of the stepping regions 96 is demarked from its neighbouring region by a strengthening rib or web 98. The strengthening ribs 98 contribute to the rigidity of the transition section. Here the stepping regions 96 are embodied as relatively thin plate-like sections.

At this point, it should be appreciated that although the illustrated embodiment includes a plurality of stepping regions 96, this is not essential and instead the transition section 90 may define any number of stepping regions, which includes only a single continuous stepping region that defines a curved surface extending circumferentially about the transition section 90 substantially uninterrupted.

As can be seen in FIG. 11, the stepping regions 96 provide a beneficially stable surface or platform that is flat enough to support a maintenance engineer inside an internal chamber 97 that is surrounded by the rotor support frame 72 and, thus, also by the generator cabinet 81. This aspect is also benefitted by various other aspects of the rotor support frame, particularly its internal dimensions. For example, the internal diameter of the rotor connection flange is greater than 1.8 m, but can be greater than 2.0 m, or even 2.2 m. This provides suitable headroom for a maintenance engineer inside the rotor support frame 72. This aspect can be further appreciated by observing the transition section 60 in FIGS. 3 to 5, which defines a much steeper angle with respect to the rotational axis which limits the size of the space inside the rotor assembly. Moreover, the steep surface presented by the transition section 60 would not be possible for a maintenance engineer to stand on comfortably or safely.

A further beneficial aspect of the rotor support frame 72 is the axial dimension between the rotor connection flange 82 and the gearbox connection flange 80. In the illustrated embodiment, the dimension marked as 'A' (see FIG. 6) indicates the length along the rotational axis between the rotor connection flange 82 and the gearbox connection flange 80. The dimension A is preferably greater than 0.5 m, to give useful 'depth' in the internal chamber 97 of the rotor support frame 72 to accommodate maintenance personnel fully inside. Still preferably, the dimension A is greater than 0.6 m.

The depth in the internal chamber 97 of the rotor support frame 72 is also benefitted by the shallow angle of the stepping regions 96. As can be seen in FIG. 6, the stepping regions 96 define an angle of less than 30 degrees with respect to a line parallel to the rotational axis. This angle is indicated as 'B' in FIG. 6. Expressed another way, the portion of the transition section 90 defines a cone angle of less than 60 degrees. The shallow angle that the frustoconical section defines with the rotor axis R contributes to the depth of the internal chamber 97 of the cylindrical field structure 74.

As has been discussed above, due to the internal dimensions of the internal volume 97 of the rotor support frame 70, both its internal diameter and the depth 'A', a maintenance engineer is able to climb inside it and access various of its components and other components associated with the generator. This is a significant advantage because it means that maintainability of the generator is enhanced considerably.

As well as defining the stepping regions 96, the transition section 90 further includes the axial-facing surface portion 94. The axial-facing surface portion 94 defines the drive end 76 of the transition section 90 as the outer surface of the transition section 90 turns through approximately 90 degrees to provide a flat end face which is substantially perpendicular to the rotational axis R. Beneficially, the strengthening ribs 98 extend along the stepping regions 96 in a direction aligned with the rotational axis and span between the stepping regions 96 and the axial-facing surface portion 94.

The axial-facing surface portion 94 is provided with an array of access apertures 100 which penetrate the depth of the axial-facing surface portion 94.

The access apertures 100 are arranged in a circular array in this embodiment and are angularly equi-spaced. In total there are nine access apertures 100 in the illustrated embodiment, arranged in a one-per-stepping region 96 configuration. The circular array of access apertures 100 is radially inwards of the stepping regions 96 and is radially outwards of the gearbox connection flange 80. In this sense, it can be considered located radially between the gearbox connection flange 80 and the stepping regions 96.

The access apertures 100 permit access through the rotor support frame 72 so that a maintenance engineer can carry out a range of tasks such as monitoring components of the gearbox output shaft such as bearing sensors (temperature sensors and accelerometers) rotary encoders for example. To this end, the access apertures should be of a suitable cross-sectional area to allow a maintenance engineer to extend a hand through one of the apertures and reach as far as is necessary. For this purpose, it is envisaged that the access apertures each should provide an open area of at least 100 cm$^2$. Optionally a larger size would have benefits, such as at least 200 cm$^2$, as this would provide a larger reach through area whilst allowing improved visibility through the aperture.

Although the rotor support frame 70 functions as a single component to connect between and transmit drive from the gearbox output shaft to the cylindrical field structure 74, conveniently in the illustrated embodiment the rotor support frame 72 comprises at least first and second components, labelled here respectively as 102 and 104. Optionally, the components may be cast, e.g. of steel of a suitable grade. The first component 102 is radially inwards of the second component, and both components function together as a hub for the cylindrical field structure 74. The first component 102 can therefore be considered an "inner hub component" 102 and the second component 104 can therefore be considered an "outer hub component" 104.

As can be seen from the Figures the gearbox connection flange 80 is part of the inner hub component 102, being separate to the outer hub component 104 which defines the transition section 90 and the rotor connection flange 82. The two components 102,104 are connected at a circular array 106 of bolts that is radially outwards of the access apertures 100. Notably, the circular array 106 has a pitch circle diameter marked as D3 on FIG. 6. The pitch circle diameter D3 of the circular array 106 is greater than the pitch circle diameter D1 of the fixing array 84. Manufacturing the rotor support frame 72 out of at least two components in this way provides a manufacturing advantage. Furthermore, this construction enables convenient access to components associated with the generator. For instance, with the rotor assembly 70 locked against rotational and radial movement, it is possible to disassemble the inner hub component 102 from the rotor support frame 72. The inner hub component 102 can therefore be removed from the gearbox by the removing the circular array 84 of bolts connecting the rotor support frame 72 to the gearbox output shaft 77 which permits access, maintenance and removal/replacement of a bearing cassette (not shown) associated with the gearbox 22 without requiring complete disassembly of the generator.

The rotor support frame 72 further comprises an extension portion 110. The extension portion 110 extends from the outer edge of the non-drive side of the rotor connection flange 82 and is cylindrical in form. The axial dimension of the extension portion 110 is approximately half the axial length of the cylindrical field structure 74. In the illustrated embodiment, the extension portion 110 takes the form of a thin-walled cylinder having a diameter approximately equal to the outside diameter of the rotor connection flange 82.

The non-drive end of the extension portion 110 also supports a ring gear 112 which is engaged by one or more drive motors 114. Here, the ring gear 112 is shown bolted to the extension portion 110 at a bolt ring 111. The ring gear 112 and drive motors 114 provide a means by which the rotational orientation of the generator rotor assembly 70 can be controlled during maintenance. For example, a maintenance engineer may need to have access to a certain part of the generator which will require the generator to be rotated to a certain position. The ring gear 112 and drive motors 114 also provide a means to cause rotation of the gearbox and main shaft via the generator rotor assembly 70. The axial dimension of the extension portion 110 may therefore be considered to be at least partly determined based on the required position of the ring gear 112. In the illustrated embodiment, the extension portion 110 also defines a plurality of airflow apertures 115. The airflow apertures 115 may in principle take any form, but as shown here there are a plurality of apertures 115 that are distributed circumferentially about the extension portion 110 and which permit air to flow radially in an outward direction. The airflow apertures 115 may be configured so that they are completely open, or they may be provided with a perforated covering such as a grille to ensure that debris or loose parts are unable to pass through the apertures 115. In addition to the airflow apertures 115 defined in the extension portion 110, the rotor support frame 72 is also provided with a second set of airflow apertures 116 (best seen in FIGS. 8 and 9) which are located in a radially inward position compared to the first set of airflow apertures 115. The second set of airflow apertures 116 are distributed circumferentially around the transition section 90 and in this embodiment are equi-angularly spaced. More specifically, each of the apertures 116 are located at the elbow defined where the transition section 90 bends sharply into the rotor connection flange 82. Each aperture 116 also features an associated guide channel 117 that extends a short way from a respective aperture 116 axially along the transition section 90. The guide channels 117 are formed as recesses or notches in the surface of the transition section 90. The number of second airflow apertures 116 is not crucial, but in the illustrated embodiment there are two apertures 116 for each stepping region 96. It should be noted that the second set of airflow apertures 116 are at a radially outer position compared to the access apertures 100. Both sets of apertures 100,116 provide airflow benefits. However, the provision of both sets of apertures 100,116 at spaced radial locations promotes a more even flow of air past the rotor support frame.

The extension portion 110 also supports a brake disc 118 which is fixed to the bolt ring 111 and therefore is in a radially outer position with respect to the ring gear 112. The brake disc 118 is acted on by a set of brake actuators 119 which are mounted on the generator service cabinet 81 and are best viewed in FIG. 10.

From the above discussion, it will be appreciated that the configuration of various aspects of the generator rotor assembly in the illustrated embodiments enhance the maintainability of various components of the generator, and particularly the generator rotor assembly. For example, the dimensions of the interior volume of the rotor support frame 72 means that a maintenance engineer can get access inside the generator. This can be useful for at least one of the following purposes. Firstly, 360 degree access is permitted to the tie rod system 86, the associated tensioning nuts 89 and also the balancing adjustment masses 87, such that an engineer can apply suitable adjustments to these components about the entire circumference of the rotor support frame 72 whilst in a single position inside the generator. This confers a significant advantage because adjustment can be carried out quickly without any disassembly of the machine. Furthermore, an engineer inside the generator also has 360 degree access to the circular array 106 of bolts connecting the gearbox connection flange 80 to the transition section 90, and also 360 degree access to the circular array 84 of bolts connecting the rotor support frame 72 to the gearbox output shaft—this allows inspection of these bolted connections to be carried out quickly which is a significant advantage during maintenance inspection processes. Also, as mentioned above, this enables the inner hub component 102 to be removed so that access to the gearbox shaft 77 is achieved, thereby permitting removal and replacement of a bearing cassette. Furthermore, the significant space inside the generator allows an engineer 360 degree access to the bolted connection between the ring gear 112 and the extension portion 110; and similar accessibility to the drive motors 114 that engage the ring gear 112. In addition to the various components that have been mentioned and shown in the Figures, it should also be appreciated that the access apertures 100 and general configuration of the rotor support frame 72 facilitates access to other internal generator components, for example: a radial rotor locking system which is provided for locking the rotor against radial movement e.g. during maintenance, an axial rotor locking system which is provided for locking the rotor against axial movement, a stray current protection system, rotary encoders which may be provided on the gearbox output shaft, other sensor systems such as accelerometers and temperature sensors that may be located on the gearbox output shaft and in other locations, brake disc components that are provided to apply a braking force to the rotor during maintenance, and pitch tube sealing parts which are provided to provide suitable sealing to pitch tube components that run centrally through the power train assembly to provide hydraulic and/or electrical power to a hydraulic pitching system located in the rotor hub.

Considered as a whole, the configuration of the rotor support frame 72 provides a comparatively open volume within it which is sized and shaped beneficially to allow access to a person who can carry a range of maintenance activities. That volume can therefore be considered to define a service room inside the generator which is sized and shaped to accommodate service personnel. This is in contrast to known approaches in which access to various components is only achieved from outside the generator, or access from inside the generator is restricted due to the relatively positioning of internal components.

Figure 11B:
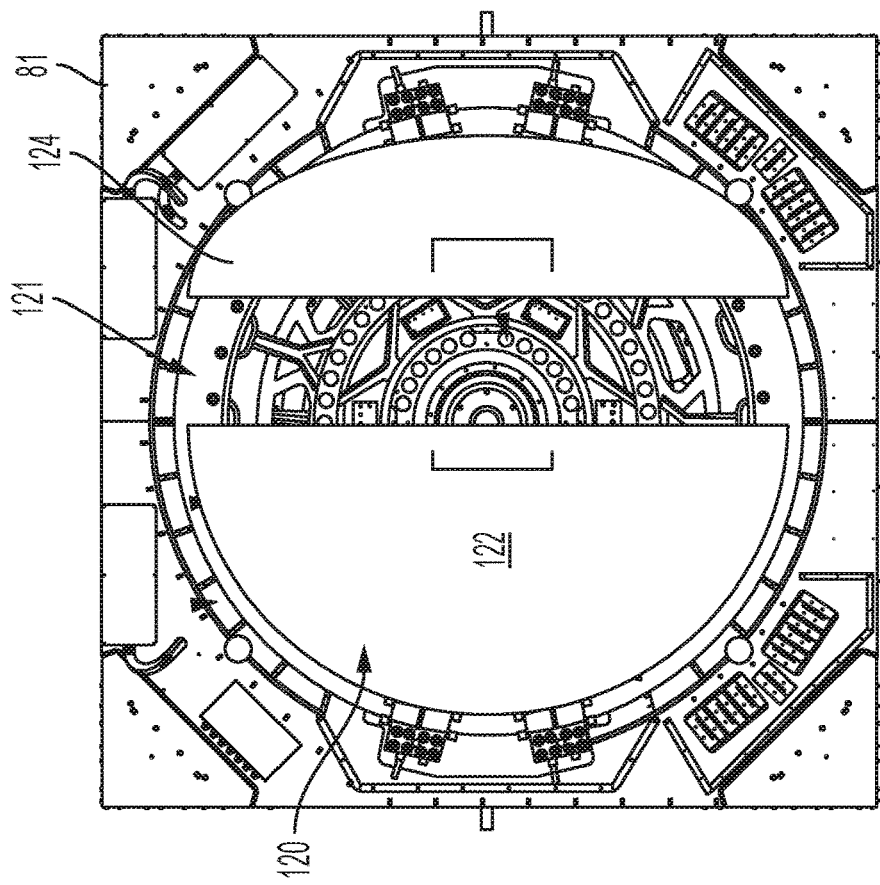
FIGS. 11a and 11b show end views like that in FIG. 10 but with an access door in closed and open conditions, respectively.
Figure 11A:
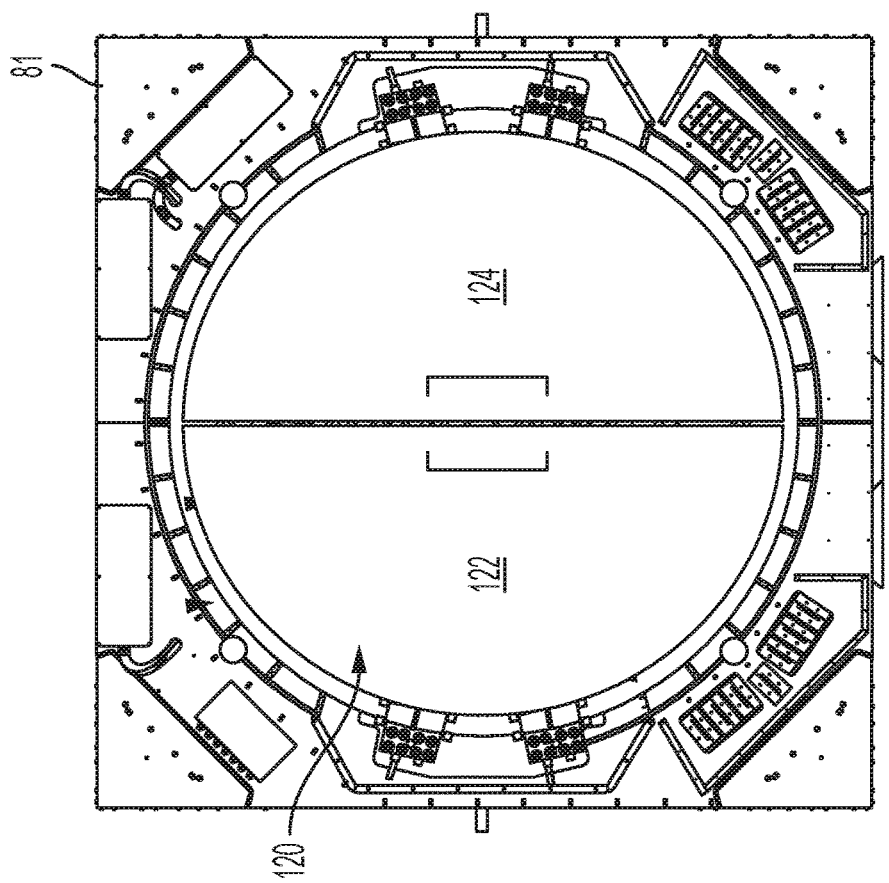

Beneficially, the open volume inside of the generator rotor assembly 70 can be enclosed to provide a more protective environment yet still allow access to maintenance personnel when required. As shown in FIGS. 11*a* and 11*b*, the rear face of the generator service cabinet 81 may be provided with a closure 120 such as a door or hatch. The closure 120 may be a single door panel that covers an opening 121 in the generator cabinet 81 into the internal chamber in which the generator rotor assembly 70 is housed. Alternatively, the closure 120 may comprise a plurality of panels. As shown in the Figures, the closure 120 comprises two door panels 122,124. Those door panels 122,124 may be mounted in any suitable way to allow opening. For example, the door panels 122,124 may be mounted by a fastening system that allows one or both of the panels to be lifted away from the cabinet opening when access inside the generator is required. Alternatively, one or both of the door panels 122,124 may be hinged such that they remain connected to the generator service cabinet 81 but can be moved to obtain access if required. FIG. 11*b* shows one of the door panels 124 having a hinged fixing, and it will be appreciated that the other door panel 122 could also have such a fixing.

Beneficially, the closure 120 encloses the internal volume of the generator which means that the internal environment is separated from the general interior of the nacelle within which it is installed.

The closure 120 achieves a further benefit in that it can provide a single service entry point into the interior volume of the generator for servicing purposes. This means that the closure can be implemented with a single safety mechanism to permit controlled entry for servicing. The safety mechanism can be by way of keypad, finger scanner, or other access control technique. Preferably, access through the enclosure will only be allowed once the safety mechanism detects that one or more other safety measures or interlocks have been addressed—for example that the rotor has been locked so that the rotor is stationary, and that appropriate electrical systems have been rendered inactive so that there are no electrical risks associated with service personal accessing the interior of the generator. Since the interior volume inside the generator is provided as a servicing room with sufficient space, the area can be designed as a dedicated workspace with which to access a number of structures and systems associated with the generator, as discussed above. For example, a floor covering may be installed in the service room so that dropped items can be captured thereby avoiding risk of loose components inside the generator. Moreover, the closed environment of the service room, by virtue of the closure 120, means that the accessible areas from the service room can be maintained in as clean a state as possible, which is easier to achieve on a small scale rather than requiring the confines of the nacelle to be sufficiently clean.

Many modifications may be made to the specific examples described above without departing from the scope of the invention as defined in the accompanying claims. Features of one embodiment may also be used in other embodiments, either as an addition to such embodiment or as a replacement thereof.

The invention claimed is:

1. A wind turbine nacelle including an outer cover defining an interior volume within which is housed a powertrain assembly comprising:
   a gearbox including an input shaft and an output shaft which are aligned on a common rotational axis (R), an electrical power generator connected to the output shaft of the gearbox,
   wherein the power generator includes a generator cabinet that encloses, in an internal chamber, a stator at a radially outward position and a rotor in a radially inward position, the rotor being rotatable about the common rotational axis, wherein the rotor comprises:
   a cylindrical field structure coupled to a rotor support frame;
   a gearbox connection flange that couples to the gearbox output shaft by a first fixing array;
   wherein the generator cabinet is provided with an opening that permits maintenance personnel to gain access fully inside the internal chamber, and wherein the internal chamber is configured to allow maintenance personnel to access at least the first fixing array that couples the gearbox output shaft to the gearbox connection flange from a position fully inside the internal chamber.

2. The wind turbine nacelle of claim 1, wherein the rotor further comprises a second fixing array that couples the gearbox connection flange to the rotor support frame, and wherein the internal chamber is configured to allow maintenance personnel to access the second fixing array from inside the internal chamber.

3. The wind turbine nacelle of claim 2, wherein the first fixing array has an associated pitch circle diameter (D1) and
   wherein the second fixing array has an associated pitch circle diameter (D3) and,
   wherein the pitch circle diameter (D1) of the first fixing array is smaller than the pitch circle diameter (D3) of the second fixing array.

4. The wind turbine nacelle of claim 1, wherein the rotor support frame is coupled to the cylindrical field structure at a rotor connection flange by a tie rod system including a plurality of tie rod tensioners configured to tension the tie rod system, and
   wherein the internal chamber is configured to allow maintenance personnel to access the tie rod tensioners from inside the internal chamber.

5. The wind turbine nacelle of claim 4, wherein the tie rod system includes a plurality of balancing adjustment masses configured to provide rotational balance to the cylindrical field structure and,
   wherein the internal chamber is configured to allow maintenance personnel to access the balancing adjustment masses from inside the internal chamber.

6. The wind turbine nacelle of claim 1, wherein the rotor further comprises a drive ring gear, and where the internal chamber is configured to allow maintenance personnel to access the drive ring gear from inside the internal chamber.

7. The wind turbine nacelle of claim 1, wherein the cylindrical field structure defines a rotor internal diameter that is greater than 2 m.

8. The wind turbine nacelle of claim 1, wherein the gearbox is a planetary gearbox with at least two stages.

9. The wind turbine nacelle of claim 1, wherein the gearbox connection flange defines a first diameter (D1) and wherein the tie-rod system defines a diameter (D2), and wherein the first diameter (D1) is less than the second diameter (D2).

10. The wind turbine nacelle of claim 9, wherein the first diameter (D1) is less than 0.7 m and wherein the second diameter (D2) is greater than 2 m.

11. The wind turbine nacelle of claim 1, wherein the rotor connection flange of the rotor support frame is spaced from the gearbox connection flange along the rotational axis by a distance that is at least 25% of the maximum outer diameter of the rotor support frame.

12. The wind turbine nacelle of claim 11, wherein the rotor connection flange of the rotor support frame is spaced from the gearbox connection flange along the rotational axis by a distance less than 0.7 m.

13. The wind turbine nacelle of claim 1, wherein the rotor connection flange of the rotor support frame is spaced from the gearbox connection flange along the rotational axis (R) by a distance that is between 20% and 60% of the internal diameter of the rotor connection flange.

14. The wind turbine nacelle of claim 1, wherein the rotor connection flange and the gearbox connection flange extend in mutually parallel planes.

15. The wind turbine nacelle of claim 1, wherein the rotor support frame further includes a transition section extending between the rotor connection flange and the gearbox connection flange.

16. The wind turbine nacelle of claim 15, wherein the transition section includes a generally frustoconical portion that defines a cone angle (B) of less than 30 degrees.

17. The wind turbine nacelle of claim 1, wherein the rotor support frame includes a plurality of access apertures.

18. The wind turbine nacelle of claim 17, wherein the access apertures define an opening of at least 100 cm$^2$.

19. The wind turbine nacelle of claim 17, wherein the access apertures are defined in an axially-facing end surface portion of the transition section.

20. The wind turbine nacelle of claim 17, wherein the access apertures provide access therethrough to at least one of the following generator features:
   i) a stray current protection system,
   ii) one or more rotary sensor components associated with the gearbox output shaft,
   iii) accelerometer systems,
   iv) temperature sensors,
   v) pitch tube sealing components.

21. The wind turbine nacelle of claim 1, further comprising a closure which covers the opening in the generator cabinet, the closure being openable by maintenance personnel to gain access fully inside the internal chamber through the opening.

22. A wind turbine comprising a tower and a wind turbine nacelle according to claim 1 supported on top of the tower.

23. A method of servicing a wind turbine powertrain in a nacelle of a wind turbine, wherein the powertrain comprises a gearbox including an input shaft and an output shaft which are aligned on a common rotational axis (R), and an electrical power generator connected to the output shaft of the gearbox, wherein the power generator includes a generator cabinet that defines an internal chamber which permits access to maintenance personnel inside the generator cabinet, the generator cabinet enclosing a stator at a radially outward position and a rotor in a radially inward position, the rotor being rotatable about the common rotational axis, wherein the rotor comprises a cylindrical field structure coupled to a rotor support frame, and a gearbox connection flange that couples to the gearbox output shaft by a first fixing array;

wherein the method comprises: gaining access to the internal chamber of the electrical power generator through an opening defined by the generator cabinet; and, carrying out service operations from a position fully inside the internal chamber.

24. The method of claim 23, wherein the service operations includes servicing at least one of the following items by maintenance personnel from a position fully inside the internal chamber:

i) a second fixing array that couples the gearbox connection flange to the rotor support frame;

ii) a tie rod system that couples the rotor support frame to the cylindrical field structure;

iii) a plurality of balancing adjustment masses configured to provide rotational balance to the cylindrical field structure;

iv) a drive ring gear.

25. The method of claim 23, wherein the step of gaining access to the internal chamber of the electrical power generator includes releasing a closure that covers the opening of the generator cabinet thereby to reveal the opening for accessing the internal chamber.

26. The wind turbine nacelle of claim 1, wherein the rotor connection flange of the rotor support frame is spaced from the gearbox connection flange along the rotational axis (R) by a distance that is between 20% and 40% of the internal diameter of the rotor connection flange.

27. The wind turbine nacelle of claim 17, wherein the access apertures define an opening of at least 200 cm$^2$.

* * * * *